United States Patent
Huang et al.

(10) Patent No.: US 10,893,492 B2
(45) Date of Patent: Jan. 12, 2021

(54) NEAR FIELD COMMUNICATION READER WITH DYNAMIC POWER CONTROL

(71) Applicant: MAXIM INTEGRATED PRODUCTS, INC., San Jose, CA (US)

(72) Inventors: Haiyu Huang, Dallas, TX (US); Cheng-Hsien Hung, Allen, TX (US)

(73) Assignee: Maxim Integrated Products, Inc., San Jose, CA (US)

(*) Notice: Subject to any disclaimer, the term of this patent is extended or adjusted under 35 U.S.C. 154(b) by 0 days.

(21) Appl. No.: 16/740,368

(22) Filed: Jan. 10, 2020

(65) Prior Publication Data

US 2020/0236633 A1  Jul. 23, 2020

Related U.S. Application Data

(60) Provisional application No. 62/794,614, filed on Jan. 19, 2019.

(51) Int. Cl.
| | |
|---|---|
| *H04W 52/36* | (2009.01) |
| *H04W 4/80* | (2018.01) |
| *H04B 5/00* | (2006.01) |
| *H04B 5/02* | (2006.01) |

(52) U.S. Cl.
CPC ........ *H04W 52/367* (2013.01); *H04B 5/0037* (2013.01); *H04B 5/0081* (2013.01); *H04B 5/02* (2013.01); *H04W 4/80* (2018.02); *H04W 52/365* (2013.01)

(58) Field of Classification Search
CPC .............. H04W 52/00–60; H04W 4/80; H04B 5/00–06
See application file for complete search history.

(56) References Cited

U.S. PATENT DOCUMENTS

| | | | |
|---|---|---|---|
| 9,634,670 B2 | 4/2017 | Cho et al. | |
| 10,019,699 B2 | 7/2018 | Reddy et al. | |
| 2015/0180546 A1 | 7/2015 | Dhayni | |
| 2020/0036412 A1* | 1/2020 | Hueber | ................ H04B 5/0075 |

OTHER PUBLICATIONS

AN11742 Dynamic Power Control, Application note, Rev. 1.4—Dec. 3, 2016, NXP Semiconductors N.V.
AN11755 PN7150 Antenna Design and Matching Guide, Application note, Rev. 1.7—Jul. 10, 2019, NXP Semiconductors N.V.
5TS3921 STS3922 boosted NFC analog front-end with active load modulation, Data brief, DocID030076 Rev 1, Nov. 2016, STMicroelectronics.
ST21NFCD Near field communication controller, Data brief, DocID030297 Rev 2, Feb. 2017, STMicroelectronics.

(Continued)

*Primary Examiner* — Raymond S Dean
(74) *Attorney, Agent, or Firm* — TIPS Group

(57) ABSTRACT

A near field communication reader includes a receiver, a transmitter, a matching network, a reader antenna coupled to the matching network; a microcontroller coupled to the receiver and the transmitter, a microcontroller; and a non-transitory computer readable media coupled to the microcontroller and including code segments and data executable on the microcontroller to control a RF driver of the transmitter based upon loading level as determined, for example, by a field detector output and RF driver settings.

20 Claims, 3 Drawing Sheets

(56) References Cited

OTHER PUBLICATIONS

ST54H NFC controller and Secure Element system-in-package, Data brief, DocID030152 Rev 1, Feb. 2017, STMicroelectronics.
PN5180A0xx/C1/C2 High-performance multi-protocol full NFC frontend, supporting all NFC Forum modes, Product data sheet, Rev. 3.6—May 7, 2018, NXP Semiconductors N.\V.
PN7120 NFC controller with integrated firmware, supporting all NFC Forum modes, Product data sheet, Rev. 3.5—Jun. 11, 2018, NXP Semiconductors N.V.
UM10858 PN7462 family HW user manual, User manual, Rev. 1.4—May 14, 2018, NXP Semiconductors N.V.
STS39230 boostedNFC analog front-end with active load modulation and active peer to peer, Data brief, DocID030082 Rev 1, Nov. 2016, STMicroelectronics.
ST21NFCC Near field communication controller, Data brief, DocID027409 Rev 1, Feb. 2015, STMicroelectronics.
TRF7970A Multiprotocol Fully Integrated 13.56-MHz RFID and Near Field Communication (NFC) Transceiver IC, SLOS743M—Aug. 2011—Revised Mar. 2020, Texas Instruments.
Data Sheet for the AS3922 Half-Duplex 868/915 MHz Transceiver, Data Sheet, Rev. A1, Apr. 2001, Austria Mikro Systeme nternational.
Design and Implement NFC Applications; Session 2: Antenna Design Considerations for NXP NFC Readers, Sep. 2016, NXP Semiconductors N.V.
ST25R NFC Reader Family, Jun. 2017, STMicroelectronics.

\* cited by examiner

| DL\LL | 31 | 30 | 29 | 28 |
|---|---|---|---|---|
| 0 | 240 → | 220 | 200 | 180 |
| 1 | 220 | 200 → | 180 ↑ | 160 |
| 2 | 200 | 180 | 160 → | 140 ↑ |
| 3 | 180 | 160 | 140 | 120 |

Positive Feedback

*Fig. 3*

| DL\LL | 31 | 30 | 29 | 28 |
|---|---|---|---|---|
| 0 | 180 → | 160 | 140 | 120 |
| 1 | 200 | 180 → | 160 ↑ | 140 |
| 2 | 220 | 200 ↑ | 180 → | 160 |
| 3 | 240 | 220 | 200 → | 180 ↑ |

Negitive Feedback

*Fig. 4*

NEAR FIELD COMMUNICATION READER WITH DYNAMIC POWER CONTROL

CROSS REFERENCE TO RELATED APPLICATION(S)

This application claims the benefit of U.S. Ser. No. 62/794,614, filed Jan. 19, 2019, incorporated herein by reference.

BACKGROUND

Near-field communication (NFC) is a set of communication protocols that enable two electronic devices to establish communication by bringing them within about 4 cm (1.6 in) of each other. NFC devices are used, for example, in contactless payment systems, similar to those used in credit cards and electronic ticket smartcards and allow mobile payment to replace or supplement these systems. This is sometimes referred to as NFC/CTLS (Contactless) or CTLS NFC.

An NFC or "contactless" payment system includes a reader and a target, which may be a credit card, a debit card, a smartphone, etc. Both the reader and the target have an antenna which form a reader-target antenna pair when they are positioned sufficiently close to each other (e.g. when they are 0-4 cm apart). The mutual coupling coefficient of the reader-target antenna pair increases when the two antennas are closer together, increasing the induced current on the target.

Targets include circuitry including rectifiers, regulators, etc. that provide power to a tag using the induced current, which must be in a desired range. Readers can be provided with a dynamic power control (DCP) to adjust the transmission power of the reader to lower the induced current to save power and to protect the circuits in the target. This is particularly important for mobile, battery powered readers.

A challenge with DCP is how to detect the target-to-reader distance, especially when they get to be close together, e.g. <1 cm. For example, when the target gets closer to, or even contacts, the reader the impedance seen by a transmitter (TX) of the reader can change due to loading effects of the target. This, in turn, varies RF carrier amplitude, which can be detected by a field detector on a receiver (RX) of the reader. However, the direction of the amplitude variation is partially determined by how the reader's antenna and matching network are designed, which affect the impedance seen by the reader's transmitter during operation.

With symmetric impedance matching, the loading effect of a target getting closer to the reader increases the radio frequency (RF) field amplitude seen by the reader's transmitter. In such instances, negative feedback control can be used by maintaining the RF field seen by the transmitter within a desired range, e.g. by decreasing the RF driver current to the transmitter.

However, with asymmetric impedance matching, negative feedback control does not work because variations of the RF field at the target and reader transmitter are moving in opposite directions. That is, as the target moves towards the reader, the RF field seen by the reader's transmitter decreases, instead of increasing as was the case with symmetric impedance matching. That is, with a negative feedback system, decreasing the RF driver current to the transmitter as a target is brought towards the reader will further decrease the RX field amplitude, thereby confusing the transmitter.

Because of the aforementioned problems, previous readers that implemented DPC were limited to symmetric impedance matched systems, which present a number of problems. For example, a symmetric impedance matching system requires the EMC filter of the matching network to have a low cut-off frequency of about 14.5 MHz, which also affects the desired performance in the NFC communication. Also, symmetric impedance also suffers from a higher initial matching impedance compared to asymmetric matching because the RF field is intrinsically lower for a long target distance.

These and other limitations of the prior art will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures:

FIG. 3 is an example DL/LL RF field level table for positive feedback DPC; and

FIG. 4 is an example DL/LL RF field level table for negative feedback DPC.

DETAILED DESCRIPTION OF EXAMPLE EMBODIMENTS

Figure 1:
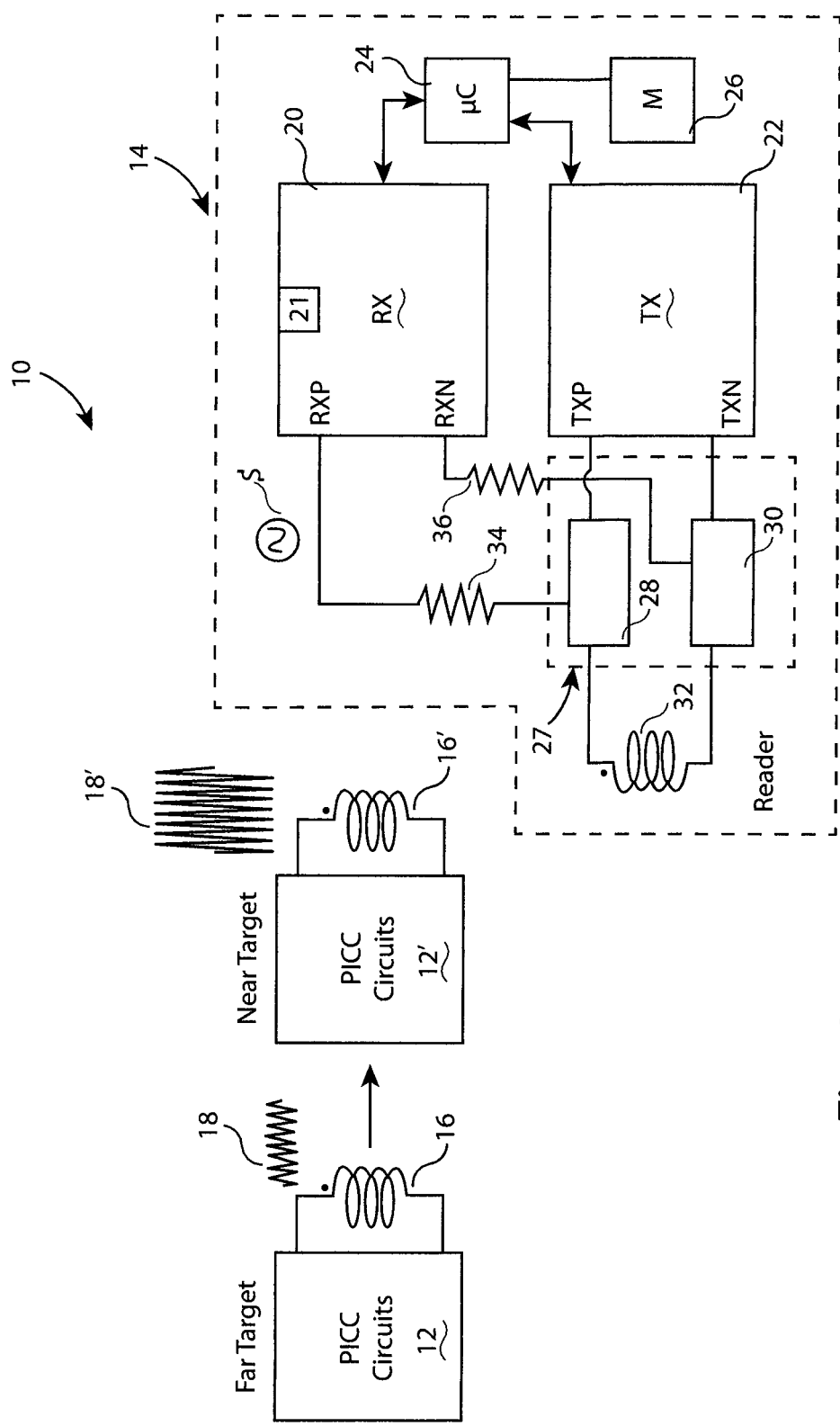
FIG. 1 is a block diagram of an example near field communication system including a reader and a target.

In FIG. 1, an example block diagram of a near field communication system 10 includes a target 12 and a reader 14. The target 12 (a/k/a "the far target") includes Proximity Integrated Circuit Card (PICC) circuits and an antenna 16, which experiences an RF signal 18. The target 12 can be a monetary card such as a credit card or a debit card, a smartphone emulating a monetary card, etc. When the target 12 is moved closer to the reader 14 as illustrated by target 12' (a/k/a "the near target"), the RF signal as experienced by antenna 16' increases, as illustrated by RF signal 18'.

Reader 14, set forth by way of example and not limitation, includes a receiver (RX) 20, a transmitter (TX) 22, a microcontroller 24, non-volatile memory 26, a matching network 27 including a positive network port 28 and a negative network port 30, and an antenna 32 attached to the positive network port 28 and the negative network port 30, in this non-limiting example. While in this non-limiting example the matching network 27 is a differential matching network, other matching networks can also be employed by other example embodiments, as noted below. In this example, RXP port of receiver 20 is coupled to the positive network port 28 by a dividing resistor 34, and an RXN port of receiver 20 is coupled to the negative network port 30 by a dividing resistor 36. The receiver 20 experiences a RF carrier signal S the differential port RXP and RXN, which can have an amplitude that becomes larger or smaller when the target moves from 12 to 12', depending upon the design of the matching networks 28 and 30 and the antenna 32. It should be noted that while the example of FIG. 1 includes a differential configuration of TX, RX and matching network, that other configurations (e.g. single ended) can be provided in other example DPC embodiments.

With continued reference to FIG. 1, a TXP port of transmitter 22 is coupled to the first matching network 28, and a port TXN is coupled to second matching network 30. The antenna 32 is coupled between the first matching network 28 and the second matching network 30, as is a resistor 36.

The microcontroller (μC) 24 is coupled to both receiver 20 and transmitter 22. As such, the microcontroller 24 can provide commands to the receiver 20 and transmitter 22 and receive information, such as the RF carrier amplitude as detected by a field detector 21 on receiver 20.

Figure 2:
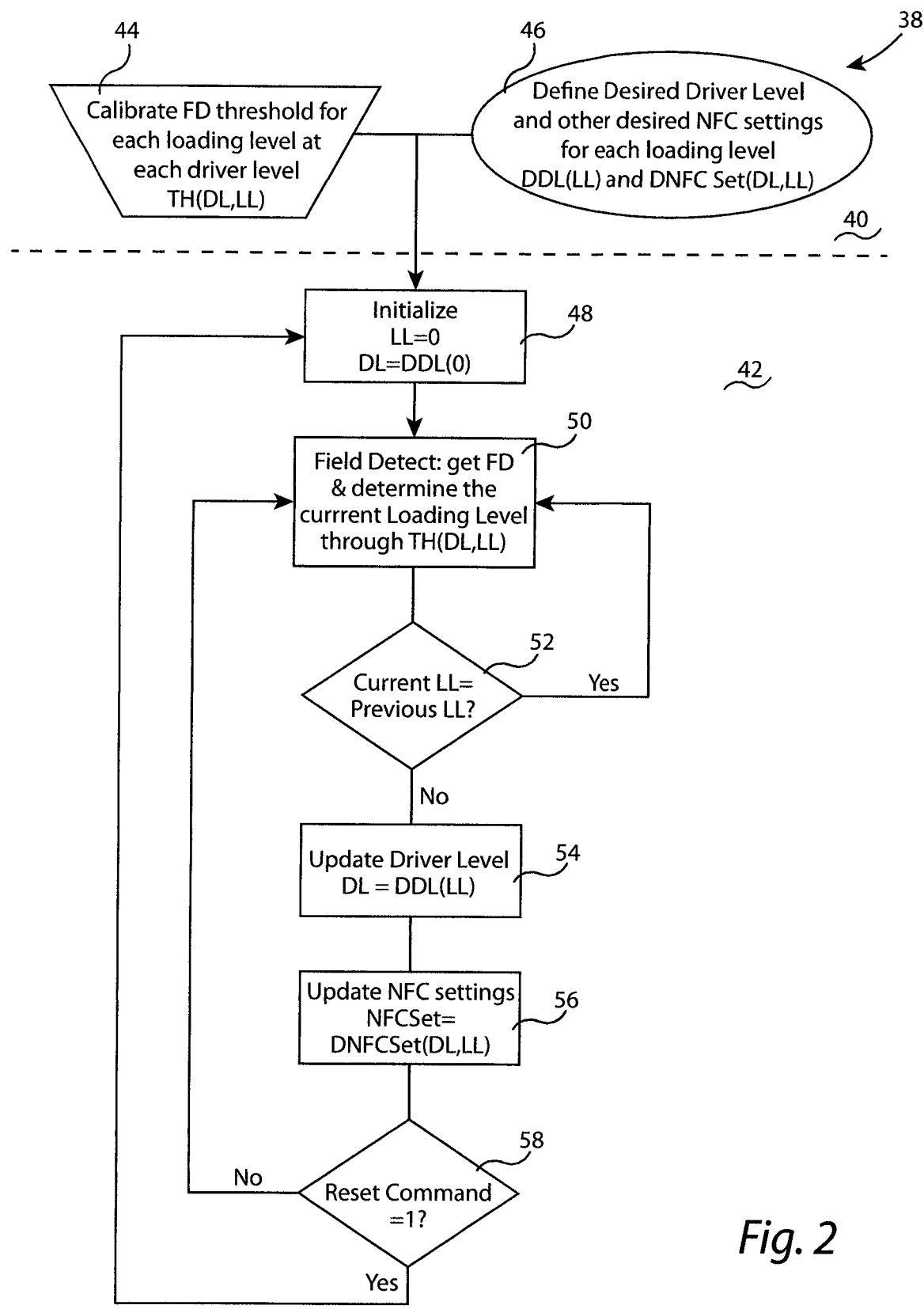
FIG. 2 is a flow diagram of an example process for dynamically controlling the power for a near field communication reader.

FIG. 2 is a flow diagram of an example process 38 for dynamically controlling the power for a near field communication reader. The process 38 includes a DPC training/calibration process 40 and a dynamic power control (DPC) operating process 42. Process 38, in this example embodiment, uses a loading level (LL) as the feedback to control the transmitter (TX) driver setting, and thus implements DPC regardless of the matching circuits employed by the reader. In this description, DL refers to the driver level, FD refers to the field detector level, TH refers to the field detector threshold for LL, and NFCSet are the near field communication (NFC) settings other than DL.

The DPC training/calibration process 40 includes a calibration process 44 and a definition process 46. In the calibration process 44, the FD threshold is calibrated for each loading level at each driver level and stored in a two dimensional array TH(DL,LL). In the definition process 46, driver levels and other desired NFC settings are defined for each loading level and stored in a one-dimensional array DDL(LL) and a two-dimensional array DNFCSet(DL,LL).

The DPC operating process 42 begins with an initialization operation 48, setting the variable LL to zero and DL to DDL(0). Next, in an operation 50, the field detector level is obtained, and the current loading level ($LL_C$) is determined in a lookup process from the two-dimensional array TH(DL, LL). In an operation 52, if $LL_C$ is the same as the previous loading level ($LL_P$), then process control returns to operation 50. If operation 52 determines that $LL_C \neq LL_P$, an operation 54 updates the driver level DL=DDL(LL). Next, in an operation 56, the NFC settings are updated as NFCSet=DNFCSet(DL,LL). Then, in a step 58, it is determined if there is a reset command. If so, process control returns to operation 48, and if not, process control returns to operation 50. In other example embodiments, operation 58 can take place at a different point in the process flow, e.g. between operations 50 and 52.

FIGS. 3 and 4 illustrate look-up tables corresponding to the two-dimensional arrays TH(DL,LL) described above. These look-up tables can be stored, by way of non-limiting example, in non-volatile (and therefore non-transitory) memory 26 of FIG. 1, and can be calibrated by, for example, operation 44 of FIG. 2. The lookup tables of both FIGS. 3 and 4 have column headers of DL values 31-28 (high to low driver levels) and row headers of LL values 0-3 (corresponding to far to near distances between the target and the reader). The values within the array correspond to field detector thresholds for particular DL/LL pairs.

For both FIGS. 3 and 4, the desired state converges onto a predetermined line DDL(LL) on the map of {DL,L}, regardless of the RX_Field. As such, both positive and negative feedback can be realized. Also, for both figures, the downwardly pointing arrows illustrate that a distance change between the target and the reader causes a loading level change, and the horizontal arrows pointing to the right indicate that loading level change triggers a driver level change. With the positive feedback procedure of FIG. 3, the FD level reduces as the distance reduces, and with the negative feedback procedure of FIG. 4, the FD level is maintained at a steady level, while for either case the driver level reduces as the distance reduces, in accordance with the design parameters of the DPC.

It will therefore be appreciated that example embodiments described herein use a virtual parameter called Loading Level (LL) as a function of RX field and TX driver setting, in order to represent the distance information of a certain card (PICC). Loading Level is a multivariable function of RX field and TX driver setting, such function is predetermined through a one-time empirical calibration for specific reader-target pair, regardless of the matching design on the reader.

For asymmetric matching case, when RX field go down at any fixed TX driver setting, the Loading Level goes up. For example, when {RX_field, DL} is {>=240, 31} or {>=220, 30}, Loading level is 0; When {RX_field, DL} is {[220~240], 31} or {[200~220], 30}, Loading level is 1.

At any loading level, there is a predefined desired driver level, for example, when the card gets closer, {RX_field, DL} changes from {250, 31} to {220, 31}, loading level changes from 0 to 1, the DPC will adjust the driver level from 31 to 30, and now {RX_field, DL} becomes {205, 30}. The loading level is still at 1 unless the card further moves closer.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A near field communication reader with dynamic power control comprising:
   a receiver having a receiving port, a field detector, and a RX control port;
   a transmitter having a transmitting port, a RF driver, and a TX control port;
   a matching network coupled to the receiver and to the transmitter;
   a reader antenna coupled to the matching network;
   a microcontroller coupled to the RX control port and the TX control port; and
   a non-transitory computer readable media coupled to the microcontroller and including code segments and data executable on the microcontroller to
   (a) calibrate a field detector threshold array for each loading level at each driver level;
   (b) define a desired driver level for each loading level; and
   (c) dynamically control the RF driver of the transmitter based upon a detected field detector level, a current loading level as determined by the field detector threshold array for the detected field detector level at a current driver level, and the desired driver level for the current loading level.

2. A near field communications reader with dynamic power control as recited in claim 1 wherein the non-transitory computer readable media includes code segments for:
(a) determining a field detector level (FD), a driver level (DL) and a previous loading level ($LL_P$) in a near field communication reader;
(b) determining a current loading level ($LL_C$) from the driver level and the field detector level;
(c) repeating operations (a) and (b) if $LL_P$ is equal to $LL_C$;
(d) updating the driver level based upon $LL_C$; and
(e) updating near field communication settings based upon the updated DL and $LL_C$.

3. A near field communications reader with dynamic power control as recited in claim 1 wherein the non-transitory computer readable media includes data the form of a look-up table defined by TH(DL,LL).

4. A near field communications reader with dynamic power control as recited in claim 1 wherein the receiving port comprises an RXP port and an RXN port.

5. A near field communications reader with dynamic power control as recited in claim 4 wherein the transmitting port includes a TXP port and a TXN port.

6. A near field communications reader with dynamic power control as recited in claim 5 wherein the matching network comprises:
a positive network port coupled to the RXP port and the TXP port; and
a negative network port coupled to the RXN port and the TXN port.

7. A near field communications reader with dynamic power control as recited in claim 1 wherein the matching network is a differential matching network comprising a positive network port and a negative network port.

8. A near field communications reader with dynamic power control as recited in claim 1 wherein the data stored in the non-transitory computer readable media comprises one or more look-up tables.

9. A near field communications reader with dynamic power control as recited in claim 8 wherein the one or more look-up tables correspond to one or more two dimensional arrays.

10. A near field communications reader with dynamic power control as recited in claim 9 wherein the one or more look-up tables include a positive feedback table and a negative feedback table.

11. A method for dynamically controlling the power for a near field communication reader comprising:
(a) initializing in a near field communication reader a previous loading level ($LL_P$) and a driver level (DL) to a value associated with $LL_P$;
(b) obtaining a field detector level (FD) of the near field communication reader and determining a current loading level ($LL_C$) from DL and FD;
(c) repeating operations (b) to (c) if $LL_P$ is equal to $LL_C$;
(d) updating DL based upon $LL_C$ if $LL_P$ is not equal to $LL_C$; and
(e) updating near field communication settings based upon the updated DL and $LL_C$.

12. A method for dynamically controlling the power for a near field communication reader as recited in claim 11 further comprising:
(f) repeating operations (b) to (f) in the absence of a reset command.

13. A method for dynamically controlling the power for a near field communication reader as recited in claim 12 further comprising:
detecting a reset command and repeating operations (a) to (f).

14. A method for dynamically controlling the power for a near field communication reader as recited in claim 13 wherein the operation of detecting a reset command follows operation (e).

15. A method for dynamically controlling the power for a near field communication reader as recited in claim 13 wherein the operation of detecting a reset command follows operation (b).

16. A method for dynamically controlling the power for a near field communication reader as recited in claim 11 further comprising calibrating a FD threshold for each loading level at each driver level prior to operation (a).

17. A method for dynamically controlling the power for a near field communication reader as recited in claim 11 comprising defining desired driver level and other desired NFC setting for each loading level prior to operation (a).

18. A non-transitory computer readable media including code segments executable on a microcontroller for:
(a) initializing in a near field communication reader a previous loading level ($LL_P$) and a driver level (DL) to a value associated with $LL_P$;
(b) obtaining a field detector level (FD) of the near field communication reader and determining a current loading level ($LL_C$) from DL and FD;
(c) repeating operations (b) to (c) if $LL_P$ is equal to $LL_C$;
(d) updating DL based upon $LL_C$ if $LL_P$ is not equal to $LL_C$; and
(e) updating near field communication settings based upon the updated DL and $LL_C$.

19. A non-transitory computer readable media including code segments executable on a microcontroller as recited in claim 18 further comprising:
(f) repeating operations (b) to (f) in the absence of a reset command.

20. A non-transitory computer readable media including code segments executable on a microcontroller as recited in claim 18 further comprising:
detecting a reset command and repeating operations (a) to (f).

* * * * *